US006991090B2

(12) United States Patent  (10) Patent No.: US 6,991,090 B2
Gaertner  (45) Date of Patent: Jan. 31, 2006

(54) SUSPENSION-CONVEYOR DIVERTER

(76) Inventor: Franz Gaertner, Muehlweg 10, 97656 Oberelsbach (DE)

( * ) Notice: Subject to any disclaimer, the term of this patent is extended or adjusted under 35 U.S.C. 154(b) by 0 days.

(21) Appl. No.: 10/838,864

(22) Filed: May 4, 2004

(65) Prior Publication Data

US 2005/0000781 A1    Jan. 6, 2005

(30) Foreign Application Priority Data

May 5, 2003   (DE) .............................. 103 20 213

(51) Int. Cl.
*B65G 17/32* (2006.01)

(52) U.S. Cl. ................. 198/680; 198/465.4; 198/678.1

(58) Field of Classification Search ............. 198/465.4, 198/678.1, 685, 683, 680

See application file for complete search history.

(56) References Cited

U.S. PATENT DOCUMENTS 6,698,575 B2 *   3/2004   Gartner .................... 198/465.4

* cited by examiner

*Primary Examiner*—Richard Ridley
(74) *Attorney, Agent, or Firm*—Myron Greenspan, Esq.; Lackenback Siegel, LLP

(57) ABSTRACT

A suspension-conveyor diverter for a conveyor for transporting hanging objects, including items of clothing hanging on hangers disposed on the conveyor, and having a conveying guide for a driveable conveying member, and also having a first carrying-element guide for at lease one transporting roller, on which the object can be hung by a carrying element such that the carrying element engages with the conveying member, and further having a second carrying-element guide, which is spaced apart from the first carrying-element guide. It is noted that a pivoting guide is provided with one end being articulated on one carrying-element guide, and which is preset such that the other free end of the pivoting guide strikes against the other carrying-element guide, so that the pivoting guide connects the first carrying-element guide and the second carrying-element guide to one another. The pivoting guide is set up for actuation, such as for deflection, by the carrying-element.

12 Claims, 10 Drawing Sheets

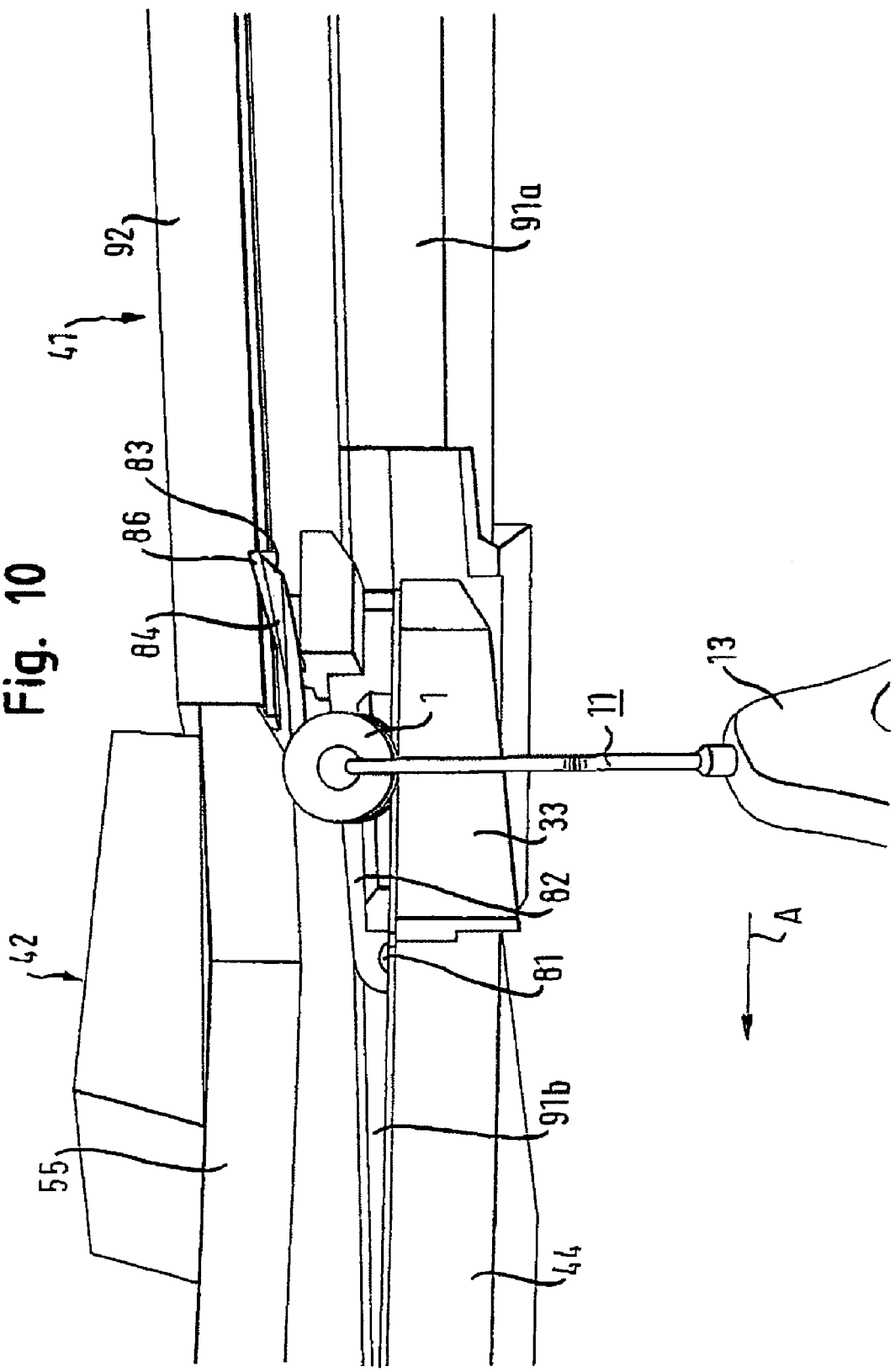

SUSPENSION-CONVEYOR DIVERTER

BACKGROUND OF THE INVENTION

The invention relates to a suspension-conveyor diverter for a conveyor for transporting hanging objects, in particular items of clothing hanging on hangers, on the conveyor, having a conveying guide for a driveable conveying means, having a first carrying-element guide for a transporting roller, on which the object can be hung by means of a carrying element such that the carrying element engages with the conveying means, and having a second carrying-element guide.

The invention also relates to a suspension conveyor for transporting hanging objects, in particular items of clothing hanging on hangers, on the suspension conveyor, having a conveying guide for a driveable conveying means, and having a carrying-element guide for transporting rollers, on which the objects can be hung by means of a carrying element such that the respective carrying element engages with the conveying means.

The invention also relates to a suspension-conveyor installation for transporting hanging objects, in particular items of clothing hanging on hangers, with a suspension conveyor having a conveying guide which guides a conveying means, having a controllable drive arrangement for driving the conveying means, and having a carrying-element guide for transporting rollers, on which the objects can be hung in each case by means of a carrying element such that the respective carrying element engages with the conveying means.

The above apparatuses are known. DE 101 23 598 discloses an installation by means of which items of clothing hanging on hangers are transported on conveyors. The items of clothing are transported by means of transporting rollers which have an axial through-passage opening. A hook of a hanger, on which the item of clothing which is to be transported hangs, is fitted into the through-passage opening. The roller runs on the conveyor. The installation has a location for supplying or introducing the transporting roller into the conveyor, with a sloping portion which opens out laterally into the conveyor. The sloping portion comprises a fixed rolling crosspiece with a transporting-roller running path which opens out into the rolling crosspiece of the conveyor; A rolling-crosspiece section and a guiding-crosspiece section are articulated on a profile rail. The rolling-crosspiece section and the guiding-crosspiece section are connected to one another by a hanger loop which is guided around the conveyor in a vertical plane. The diverter is adjusted by the hanger loop being displaced horizontally in the vertical plane. If the hanger loop has not been displaced to such a point where the crosspiece sections strike against one another, this may result in derailments.

BRIEF SUMMARY OF THE INVENTION

The object of the invention is to provide an improved diverter.

The invention achieves the object by means of a suspension-conveyor diverter for a conveyor for transporting hanging objects, in particular items of clothing hanging on hangers, on the conveyor, having a conveying guide for a driveable conveying means, having a first carrying-element guide for at least one transporting roller, on which the object can be hung by means of a carrying element such that the carrying element engages with the conveying means, having a second carrying-element guide, which is spaced apart from the first carrying-element guide, and having a pivoting guide, of which one end is articulated on one carrying-element guide and which is preset such that the other, free end of the pivoting guide strikes against the other carrying-element guide, with the result that the pivoting guide connects the first carrying-element guide and the second carrying-element guide to one another, the pivoting guide being set up for actuation by means of the carrying element.

The suspension-conveyor diverter according to the invention is particularly straightforward to construct and reliable to operate. Construction is straightforward because the diverter can be adjusted passively if a route of the transporting roller is defined by the diverter, and there is thus no need for any active member for setting the diverter in dependence on the defined route. Since the diverter functions passively, the susceptibility to control-related errors is minimized.

In the case of one embodiment, the pivoting guide of the diverter is preset into a through-passage position, in which the transporting roller with the carrying element runs through the diverter over a preset transporting route without deflecting the pivoting guide. If the transporting roller with the carrying element runs through the diverter along a non-preset transporting route, the carrying element deflects the pivoting guide. The pivoting guide then moves back into the preset position. On account of the preset through-passage position, the diverter is usually located in a reliable operating position, with the result that the risk of derailment is minimized.

The pivoting guide is preferably mounted on one carrying-element guide such that the preset pivoting guide, upon actuation, is both raised and deflected laterally, and that the pivoting guide, following actuation, drops back into the preset position on account of the weight-induced force of the pivoting guide. In the case of this embodiment, the operational reliability of the diverter reaches a particularly high level because the gravitational force is a particularly reliable means of guiding the pivoting guide back into the preset position.

In the case of one embodiment of the invention, the pivoting guide is prestressed into the preset position, for example, by means of a tension spring. Upon actuation of the preset pivoting guide, the pivoting guide is deflected counter to the prestressing. Following actuation, the pivoting guide returns into the preset position on account of the prestressing.

In the case of one embodiment, the pivoting guide is preset such that the pivoting guide can be actuated when the transporting roller with the carrying element runs through the suspension-conveyor diverter in a predetermined operating transporting direction, and that the pivoting guide blocks the carrying element when the transporting roller with the carrying element runs into the suspension-conveyor diverter counter to the predetermined operating transporting direction.

In the case of one embodiment, the suspension-conveyor diverter is designed such that, if the suspension-conveyor diverter is arranged such that the first carrying-element guide runs horizontally, the second carrying-element guide is inclined somewhat in relation to the horizontal and slopes downward in the operating transporting direction. In the region of the inclination, the object is transported on the second carrying-element guide on account of the weight-induced force of the object. The suspension-conveyor diverter, for transporting the object on the second carrying-element guide, thus manages without the conveying means.

In the case of one embodiment of the suspension-conveyor diverter according to the invention, the second carrying-element guide runs toward the first carrying-element guide in the operating transporting direction, and the pivoting guide is mounted on the second carrying-element guide. In the case of this embodiment, transporting rollers which run into the suspension-conveyor diverter on the second carrying-element guide are introduced onto the first carrying-element guide by the diverter. If a transporting roller with a carrying element runs into the diverter in the predetermined operating transporting direction on the first carrying-element guide, the carrying element actuates the pivoting guide and the transporting roller passes through the diverter on the first carrying-element guide. If the transporting roller with the carrying element runs into the diverter in the predetermined operating transporting direction on the second carrying-element guide, the transporting roller passes through the diverter on the second carrying-element guide, on the pivoting guide, until it strikes against the first carrying-element guide, and on the first carrying-element guide, without any actuation of the diverter by the carrying element being required.

In the case of another embodiment of the suspension-conveyor diverter according to the invention, the second carrying-element guide runs away from the first carrying-element guide in the operating transporting direction, and the pivoting guide is mounted on the first carrying-element guide. In the case of this embodiment, the diverter can be adjusted in order for transporting rollers which run into the suspension-conveyor diverter on the first carrying-element guide to be directed out onto the second carrying-element guide. The suspension-conveyor diverter set up for outward directing movement preferably has an adjusting control member for setting the diverter in a controllable manner either into a conveying position, in which the transporting roller passes through the suspension-conveyor diverter on the first carrying-element guide, or into a branching position, in which the transporting roller is directed from the first carrying-element guide onto the second carrying-element guide.

In the case of one embodiment, the adjusting control member is preset into the conveying position, is adjusted into the branching position by actuation and, following the actuation, returns into the preset position. This embodiment of the diverter is particularly suitable if the diverter is only intended to direct transporting rollers outward as an exception, because actuation of the adjusting control member is then only seldom necessary.

The adjusting control member is preferably designed as a connecting component which, in the conveying position, connects an entry section of the first carrying-element guide to an exit section of the first carrying-element guide and, in the branching position, connects the entry section of the first carrying-element guide to the second carrying-element guide. In the case of this embodiment, the diverter manages with a particularly small number of parts because the adjusting control member performs a number of guide functions.

In the case of one embodiment, the carrying-element guide has a base rail and a top rail, which are provided for guiding-type engagement with the transporting roller. The adjusting control member, which is designed as a connecting component, preferably has a connecting arm here, which is designed as base rail, and a connecting hand, which is designed as top rail. The connecting arm is preferably formed integrally with the connecting hand.

The adjusting control member is preferably articulated on the first carrying-element guide such that, in the conveying position of the adjusting control member, the first connecting arm, which is designed as base rail, connects the base rail in the entry section of the first carrying-element guide to the base rail in the exit section of the first carrying-element guide and, in the branching position of the adjusting control member, the connecting hand, which is designed as top rail, connects the top rail in the entry section of the first carrying-element guide to the top rail of the second carrying-element guide.

The invention also achieves the object by means of a suspension conveyor for transporting hanging objects, in particular items of clothing hanging on hangers, on the conveyor, having a conveying guide for a driveable conveying means, having a carrying-element guide for transporting rollers, on which the objects can be hung by means of a carrying element such that the respective carrying element engages with the conveying means, and having a suspension-conveyor diverter according to the invention.

The invention also achieves the object by means of a suspension-conveyor installation for transporting hanging objects, in particular items of clothing hanging on hangers, with a suspension conveyor having a conveying guide which guides a conveying means, having a controllable drive arrangement for driving the conveying means, and having a carrying-element guide for transporting rollers, on which the objects can be hung in each case by means of a carrying element such that the respective carrying element engages with the conveying means, the suspension conveyor being designed according to the invention.

BRIEF DESCRIPTION OF THE SEVERAL VIEWS OF THE DRAWINGS

Exemplary embodiments of the invention are explained in more detail hereinbelow with reference to the figures, in which:

FIG. 10 shows a perspective view of the outlet diverter in FIGS. 7 to 9, the transporting roller rolling on the pivoting rail.

DETAILED DESCRIPTION OF THE INVENTION

Figure 1:
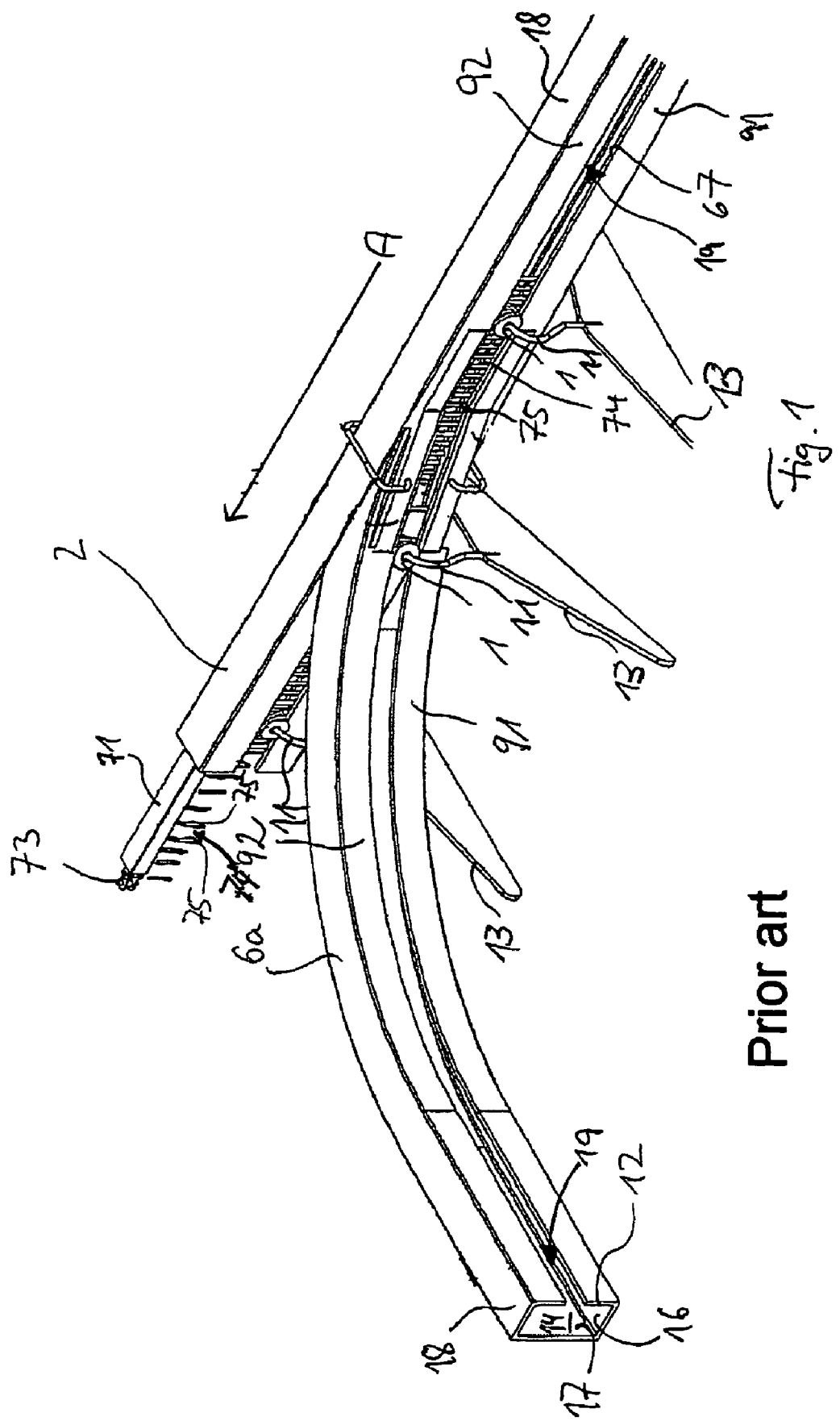
FIG. 1 shows a diverter of a suspension-conveyor installation according to the prior art.
Figure 2:
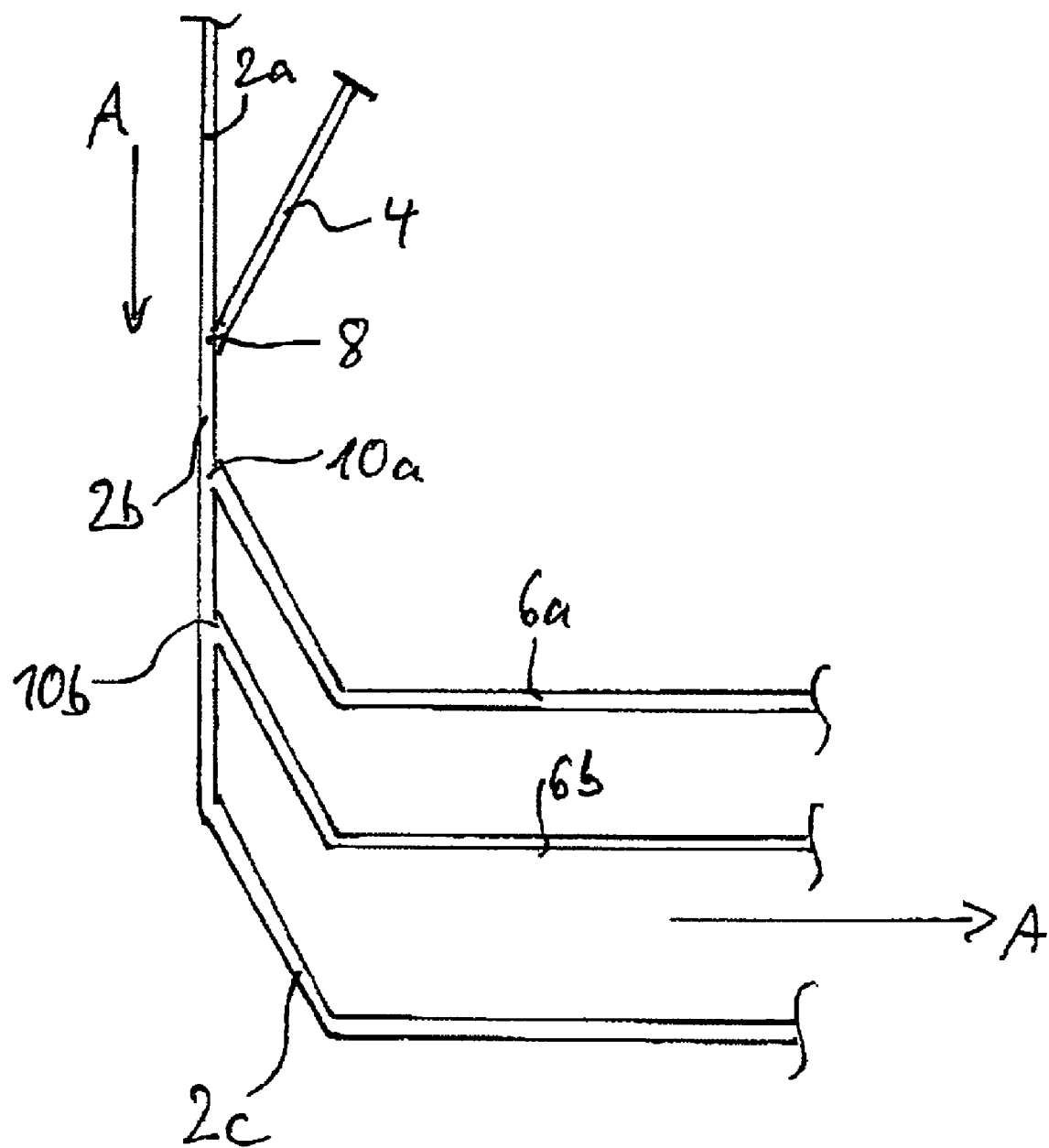
FIG. 2 shows, schematically, part of an exemplary embodiment of a suspension-conveying installation according to the invention for transporting items of clothing hanging on hangers.

The suspension-conveyor installation comprises a suspension conveyor 2a, 2b, 2c which is routed in an open circuit (FIG. 2). The suspension conveyor has a feed path 4 for feeding items of clothing for transportation onto the conveying circuit, and also has discharge paths 6a, 6b for conveying items of clothing which have been separated out. The suspension conveyor is set up for transporting the items of clothing in an operating transporting direction (A). The feed path 4 opens out in the operating transporting direction (A), via an inlet diverter 8, into the suspension conveyor 2b of the conveying circuit. The discharge paths 6a, 6b branch off from the suspension conveyor 2b in the operating transporting direction (A) via outlet diverters 10a, 10b.

Figure 3:
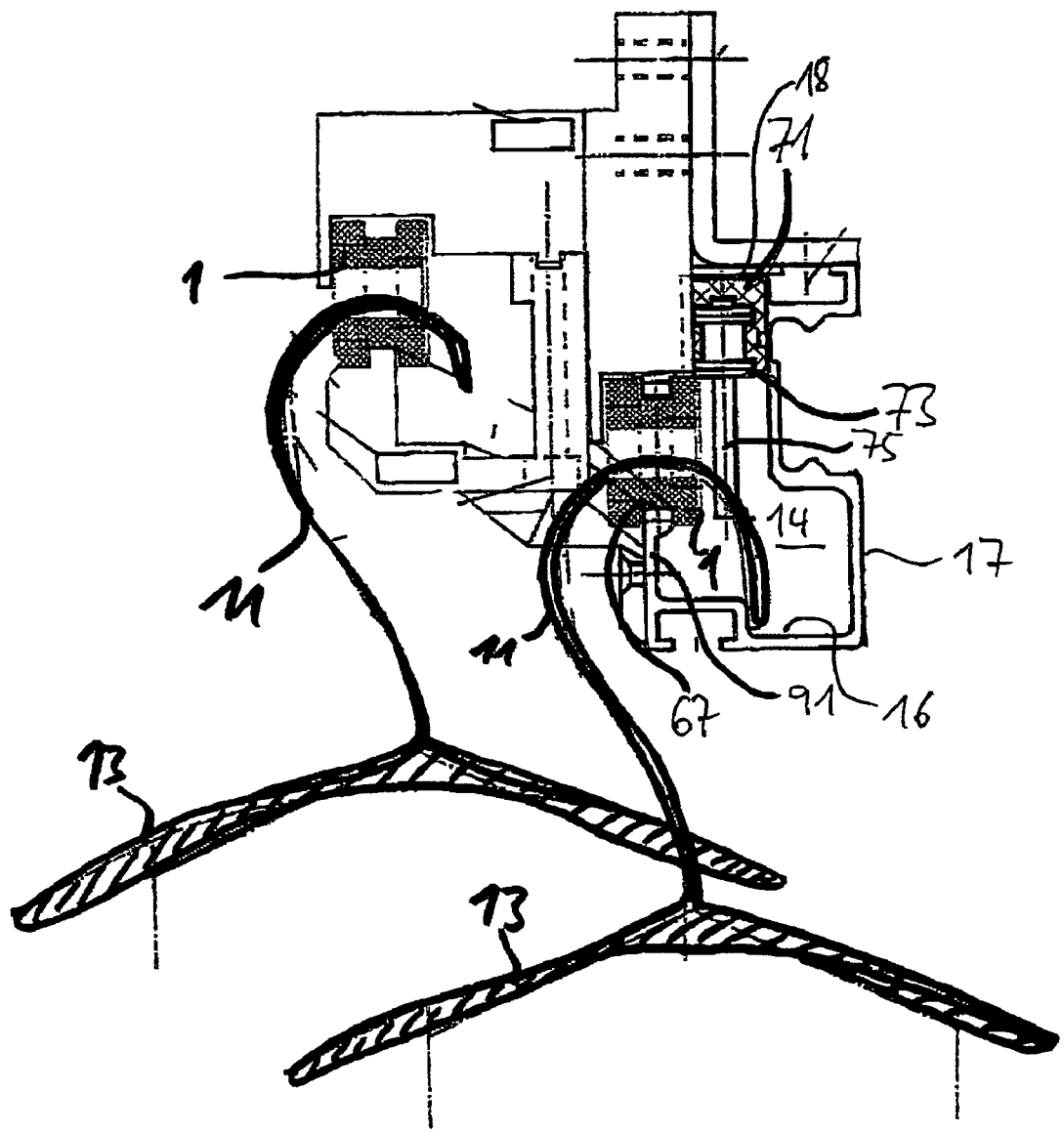
FIG. 3 shows a cross section through an exemplary embodiment of a suspension-conveyor diverter according to the invention.

The suspension conveyor 2 has an essentially C-shaped profile 12, which is envisaged for accommodating transporting rollers 1 into which in each case one hook 11 of a clothes hanger 13, on which an item of clothing (not illustrated) hangs, can be fitted (FIG. 3). The C-shaped profile 12 has a base wall 16, a top wall 18, which is located opposite the base wall 16, and a side wall 17. Located opposite the side wall 17, the C-shaped profile 12 has an opening 19. The C-shaped profile 12 comprises an inner space 14.

The suspension conveyor 2 has a base rail 91 and a top rail 92, which is located opposite the base rail 91. The base rail 91 forms a rolling crosspiece with a main running path 67 for the transporting rollers 1. The top rail 92 forms a guiding crosspiece for the transporting rollers 1. A hook 11 of a clothes hanger 13 is fitted into the transporting roller 1 by way of the free end 15 of the hook 11 such that the free end 15 of the hook projects out of the transporting roller 1. An item of clothing (not illustrated) is hung on the clothes hanger 13.

A conveying guide 71, in which a conveying chain 73 is arranged, is formed in the top region of the inner space 14 of the suspension conveyor 2. In a drive section of the suspension conveyor 2, a pinion of a driving gearwheel (not illustrated) engages in the conveying chain 73. The conveying chain 73 is arranged in the conveying guide 71 for essentially horizontal circulation such that the chain flanges of the conveying chain 73 are located approximately horizontally. The chain links are connected by means of conveying pins 75, of which the length is greater than the width of the conveying chain 73. The conveying pins 75 project downward beyond the chain flanges. Two adjacent conveying pins 75 are spaced apart from one another and form an interspace 74. The free end 15 of the hook 11 hanging in the transporting roller 1 engages in the interspace between two adjacent conveying pins 75.

Figure 4:
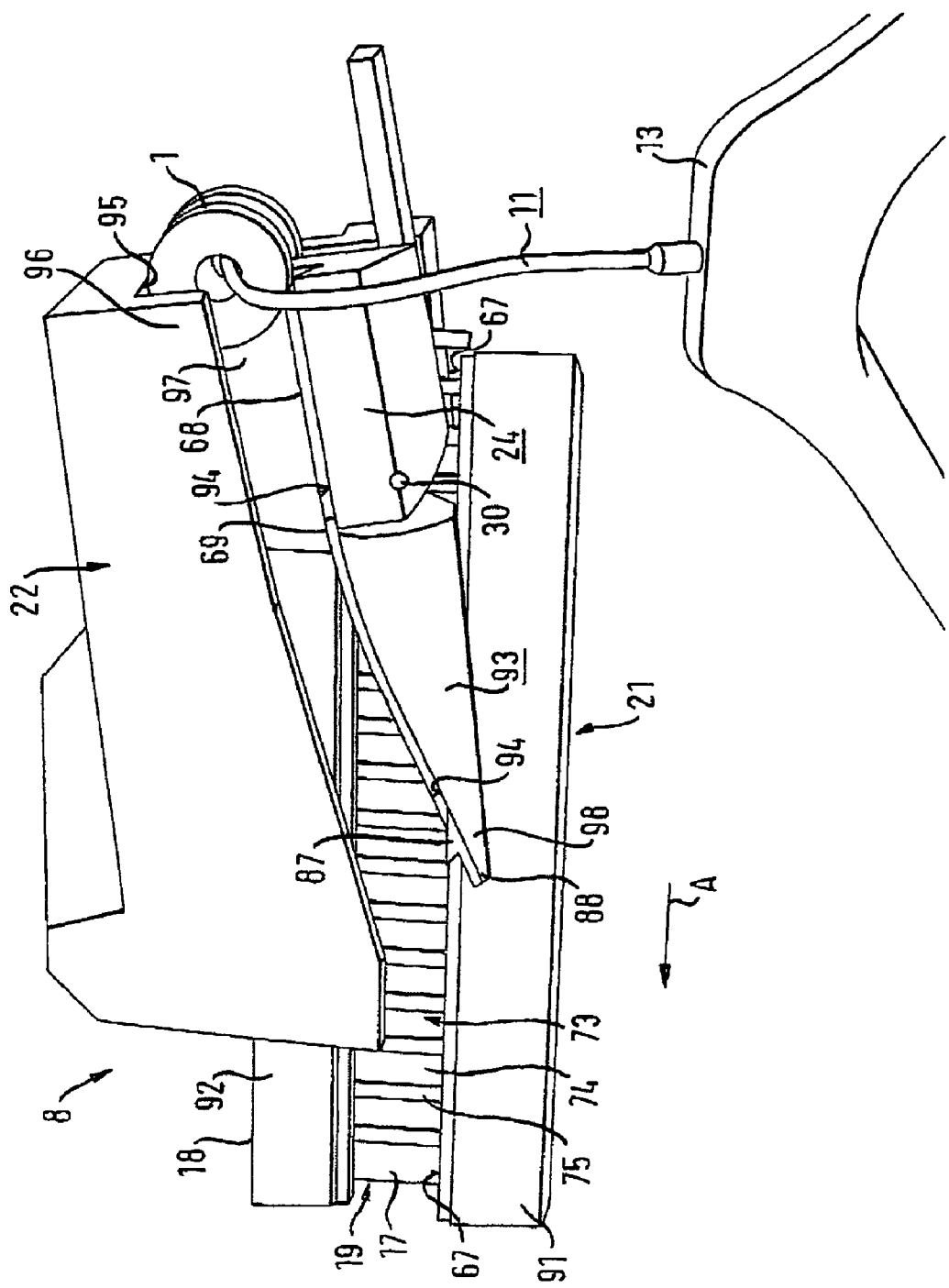
FIG. 4 shows a perspective view of a further exemplary embodiment of the suspension-conveyor diverter according to the invention, in the case of which the suspension-conveyor diverter is designed as an inlet diverter, a transporting roller with a clothes hanger rolling on a first running path.
Figure 5:
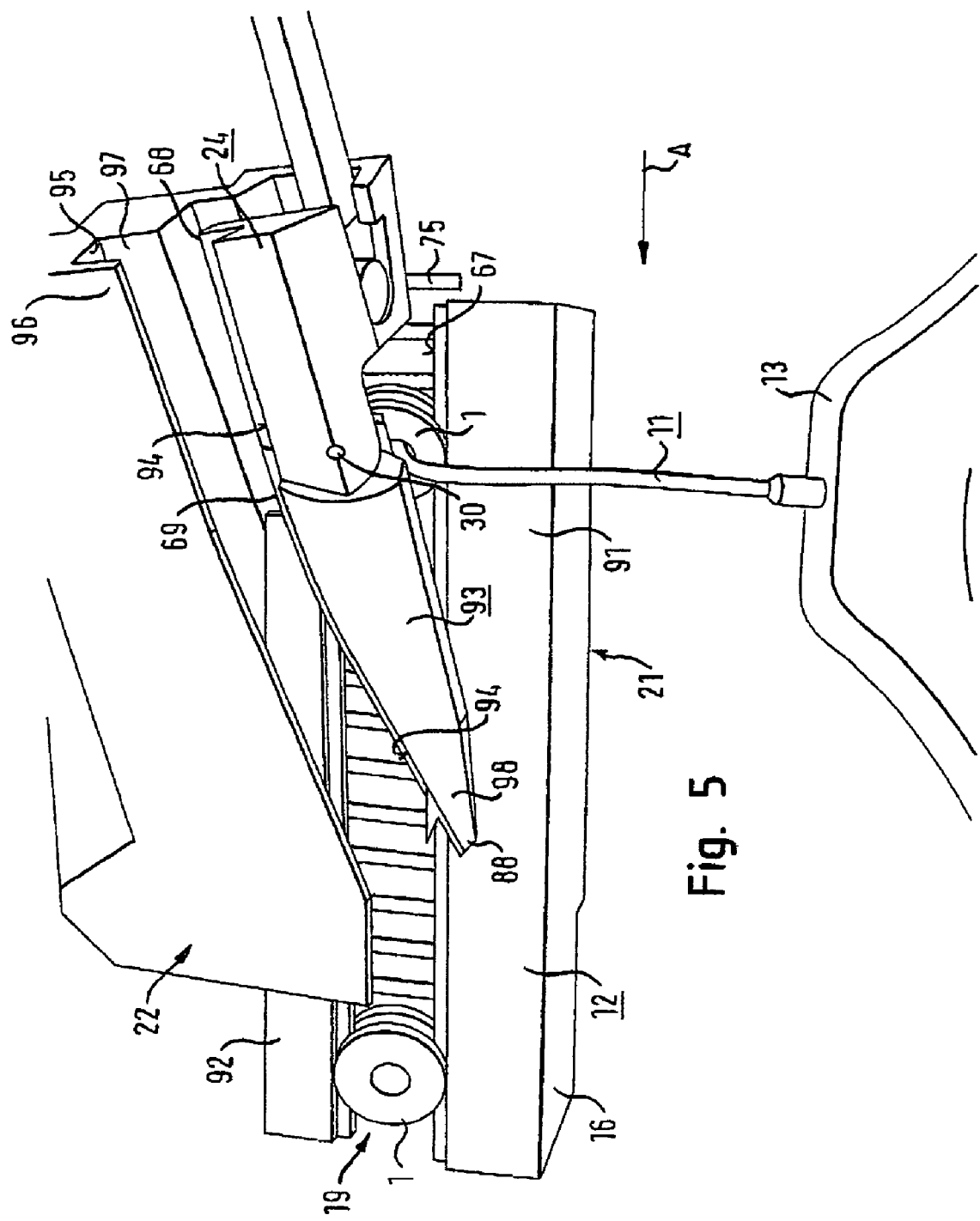
FIG. 5 shows a perspective view of the inlet diverter in FIG. 4, the transporting roller rolling on a second running path, in a first section of the second running path.
Figure 6:
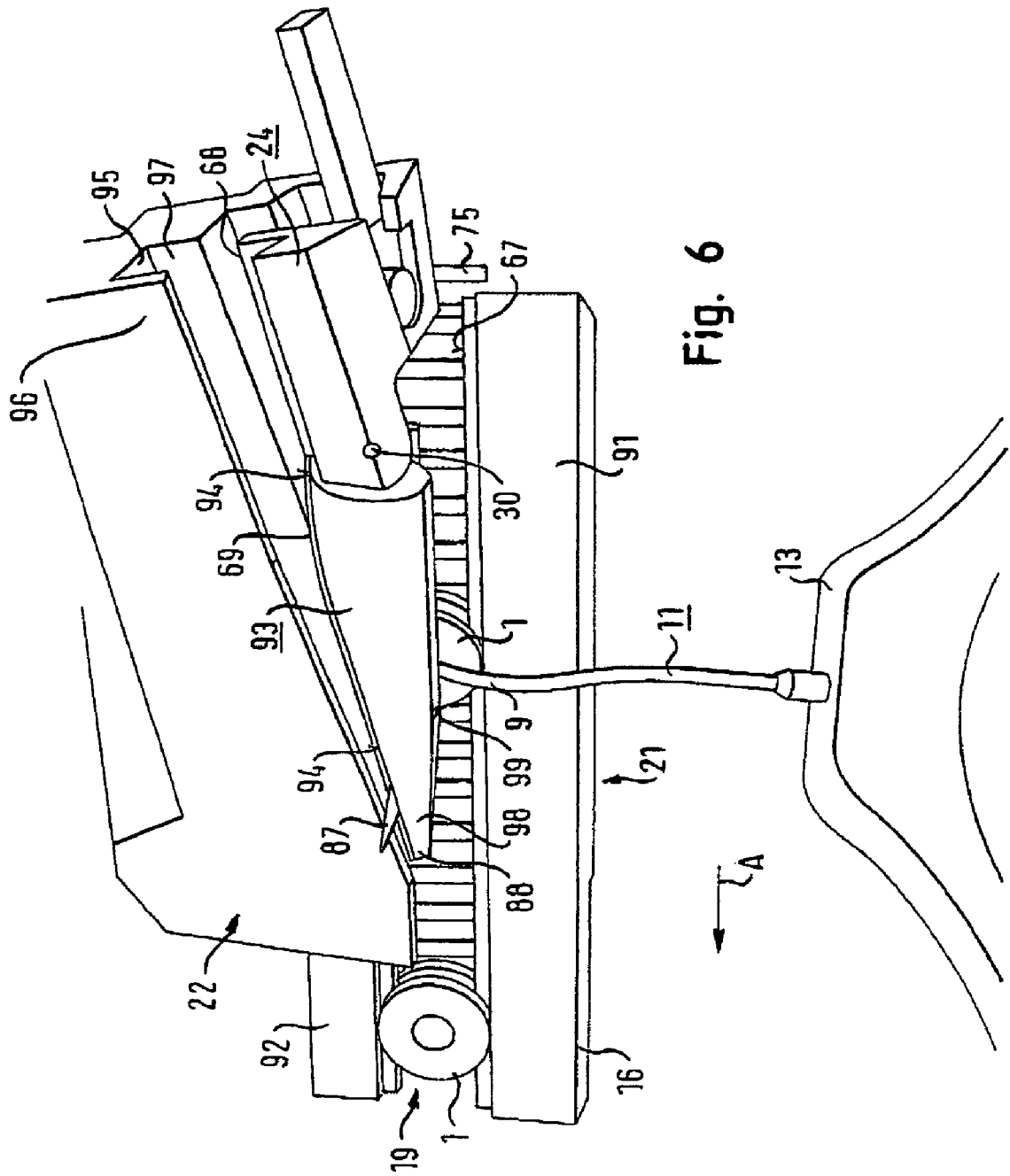
FIG. 6 shows a perspective view of the suspension-conveyor diverter in FIGS. 4 and 5, the transporting roller rolling on the second running path, in a second section of the second running path.

The inlet diverter 8 will be explained hereinbelow (FIGS. 4–6). The inlet diverter 8 has a first suspension-conveyor portion 21 of the above described suspension conveyor 2 with the C-shaped profile 12. On that side of the first suspension-conveyor portion 21 on which the C-shaped profile 12 has the opening 19, a second suspension-conveyor portion 22 is fastened on the first suspension-conveyor portion 21.

The second suspension-conveyor portion 22 has an inlet base rail 24, which is spaced apart from the base rail 91 of the first suspension-conveyor portion 21. The inlet base rail 24 runs at an acute angle toward the base rail 91 of the first suspension-conveyor portion 21 and slopes in the direction of the base rail 91. The inlet base rail 24 has an inlet crosspiece, of which the surface forms an inlet path 68.

A pivoting rail 93 with a connecting rolling crosspiece 94 for the transporting rollers 1 is articulated on the inlet base rail 24, and the surface of said connecting rolling crosspiece forms a connecting running path 69. One end of the pivoting rail 93 is mounted on the inlet base rail 24 such that it can be pivoted by means of a bearing pin 30. A free end 98, which is located opposite the mounted end of the pivoting rail 93, fits closely against the base rail 91 of the first suspension-conveyor portion 21. The free end 98 of the pivoting rail 30 is split into a horizontal tongue 87 and a vertical tongue 88. The horizontal tongue 87 rests on the main running path 67 and thus extends the connecting running path 69 of the pivoting rail to the main running path 67. The vertical tongue 88 butts laterally against the base rail 91 and gives the pivoting rail 93 support. The pivoting rail 93 is mounted obliquely on the inlet base rail 24 by means of a bearing pin 30 such that the pivoting rail 93, when pivoted, is deflected both upward and to the side.

Furthermore, located at the top opposite the inlet base rail 24 and the pivoting rail 93, the second suspension-conveyor portion 22 has a guide channel. The guide channel has a top wall 95, a guide sleeve 96 and a guide wall 97. The guide sleeve 96 and the guide wall 97 extend laterally downward from the top wall 95 approximately to halfway between the inlet base rail 24 and the top wall 95.

The inlet path 68, the connecting running path 69 and the main running path 67, in this sequence in the transporting operating direction (A), form a preset through-passage path through the inlet suspension-conveyor diverter 8.

The operation of the inlet diverter 8 will be explained hereinbelow. The conveying-chain drive (not illustrated) is switched on. The conveying chain 73 circulates endlessly in the conveying installation. In particular, the conveying chain 73 runs horizontally in the conveying guide 71 of the suspension conveyor 2.

A transporting roller 1 with the clothes hanger 13, which is fitted into the transporting roller 1 by the hook 11, runs into the inlet diverter 8 on the inlet path 68 of the inlet base rail 24 (FIG. 4). The transporting roller 1 rolls toward the pivoting rail 93 of the inlet diverter 8 in the operating transporting direction (A). On account of the slope of the inlet path 68 and of the slope of the connecting running path 69, the transporting roller 1 rolls via the inlet path 68 and follows the preset through-passage path through the inlet suspension-conveyor diverter 8. When the transporting roller reaches the free end 98 of the pivoting rail 93, the free end 15 of the hook 11 fitted into the transporting roller 1 engages in the interspace 74 between two conveying pins 75 of the conveying chain 73. The second conveying pin 75 grips the free end of the hook 11 and carries along the hook 11 horizontally, together with the transporting roller 1 and clothes hanger 13 and any item of clothing which may be hanging thereon, on the suspension conveyor 2 of the inlet diverter 8.

A transporting roller 1, with the hook 11 on which the clothes hanger 13 is fastened fitted, is then carried along into the inlet diverter 8, by the conveying chain 73, on the main running path 67 of the base rail 91 (FIG. 5). The transporting roller 1 rolls toward the pivoting rail 93 of the inlet diverter 8 in the operating transporting direction (A). The free end 98 of the pivoting rail 93, this free end fitting closely against the base rail 91, is located along the transporting route of the hook 11 on the main running path 67. The conveying chain 73, however, carries along the hook 11 further (FIG. 6). A spine 9 of the hook 11 strikes against an underside 99 of the pivoting rail 93 and forces the pivoting rail 93 upward counter to the weight-induced force of the pivoting rail 93. The pivoting rail 93, which is mounted on the bearing pin 30, is deflected here both outward and to the side. The free end 98 of the pivoting rail 93 here moves away from the base rail 91, while the hook 11 continues the transporting movement through the inlet diverter 8. Once the hook 11 has passed the free end 98 of the pivoting rail 93, the pivoting rail 93, on account of its weight, pivots downward again and at the same time, on account of the obliquely mounted bearing pin 30, pivots back into the starting position, in which the free ends 98 fits closely against the base rail 91. The conveying chain 73 has thus carried along the hook 11 by means of the transporting roller 1 on the non-preset path through the inlet diverter 8 without the inlet diverter 8 having been activated. Rather, the hook 11 has actuated the pivoting rail 93 and has thus caused the path to be freed.

The outlet diverter 10 will be explained hereinbelow. The outlet diverter 10—like the inlet diverter 8—has a first suspension-conveyor portion 41 of the abovedescribed suspension conveyor 2 with the C-shaped profile 12 (the conveying pins have not been illustrated in the figures with the outlet diverter).

On that side of the first suspension-conveyor portion 41 on which the C-shaped profile 12 has the opening 19, a second suspension-conveyor portion 42 is fastened on the first suspension-conveyor portion 41. The second suspension-conveyor portion 42 has an outlet base rail 44, which is spaced apart from the base rail 91 of the first suspension-conveyor portion 41. The outlet base rail 44 runs at an acute angle away from the base rail 91 of the first suspension-conveyor portion 41 and is inclined in the direction of the base rail 91. The outlet base rail 44 has an outlet crosspiece, of which the surface forms an outlet path 58.

A pivoting rail 33 with a connecting rolling crosspiece 34 for the transporting rollers 1 is articulated on the base rail 91, and the surface of said connecting rolling crosspiece forms a connecting running path 59 with a slope. One end of the pivoting rail 33 is mounted on the base rail 91 such that it can be pivoted by means of a bearing pin (not illustrated in FIGS. 7 to 10). A free end 35, which is located opposite the mounted end of the pivoting rail 33, fits closely against the outlet rail 44 of the second suspension-conveyor portion 42. The pivoting rail 33 is mounted obliquely such that the pivoting rail 33, when pivoted, is deflected both upward and to the side in the direction of the first suspension-conveyor portion 41.

Located at the top opposite the outlet base rail 44 and the pivoting rail 33, the second suspension-conveyor portion 42 has a top guide rail 55.

A first section 67a of the main running path 67, the connecting running path 59 and the outlet path 58, in this sequence in the operating transporting direction (A), form a preset through-passage path through the outlet diverter 10.

The first suspension-conveyor portion 41 of the outlet diverter 10 differs from the abovedescribed suspension-conveyor portion 21 of the inlet diverter 8 in that the base rail 91 is interrupted in the center of the outlet diverter 10 and is thus divided into two segments 91a, 91b. Furthermore, the first suspension-conveyor portion 41 has a rotatably mounted, activatable adjusting control member 80 which can be preset and changed over in a controllable manner by means of a mechanism (prestressing spring, relay, magnetic switch etc.) which has not been illustrated.

The adjusting control member 80 has a connecting arm 82 which extends beyond the pivoting rail 33, approximately at right angles, from the horizontal axis of rotation of the bearing 81 of the adjusting control member 80. Located opposite the bearing 81, the connecting arm 82 has a free end 83. Integrally formed on the free end 83 is a connecting hand 84 which extends some way downward, approximately in the direction of the axis of rotation, at the rear. A top section of the free end 83 of the connecting arm 82 has a rectangular rolling-crosspiece profile. The top rail 92, a little above the free end of the connecting arm 82, has a notch 86.

Figure 9:
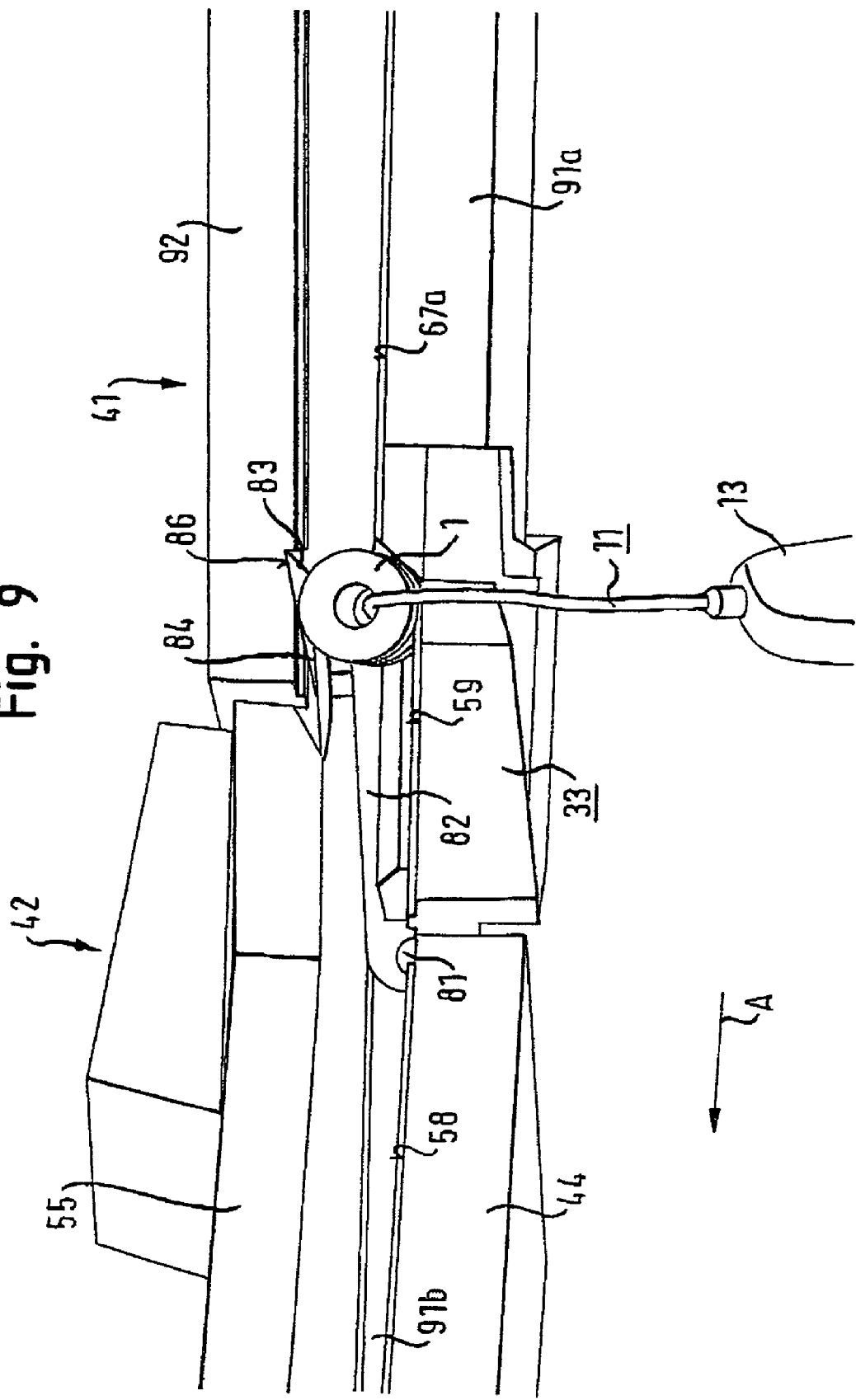
FIG. 9 shows a perspective view of the outlet diverter in FIGS. 7 and 8, the transporting roller rolling in onto a pivoting rail.

In a first position of the adjusting control member 80, the connecting arm 82 projects upward from the base-rail segment 91b and the free end 83 strikes against the notch 86 of the top rail 92 of the first suspension-conveyor portion 41 (FIGS. 9 and 10). In this case, the connecting hand 84 connects the top guide rail 92 of the first suspension-conveyor portion 41 to the top guide rail 55 of the second suspension-conveyor portion 42 (FIGS. 9 and 10). The main running path 67a of the first base-rail segment 91a of the first suspension-conveyor portion 41, the connecting running path 59 of the pivoting rail 33 and the outlet path 59 of the outlet base rail 44 of the second suspension-conveyor portion 42 form a preset through-passage path through the outlet diverter 10.

In a second position of the adjusting control member 80, the connecting arm 82 connects the second base-rail segment 91b, to the first base-rail segment 91a. In this case, the first base-rail segment 91a, the connecting arm 82 of the adjusting control member 80 and the second base-rail segment 91b form a rectilinear through-passage path through the outlet diverter 10.

Figure 7:
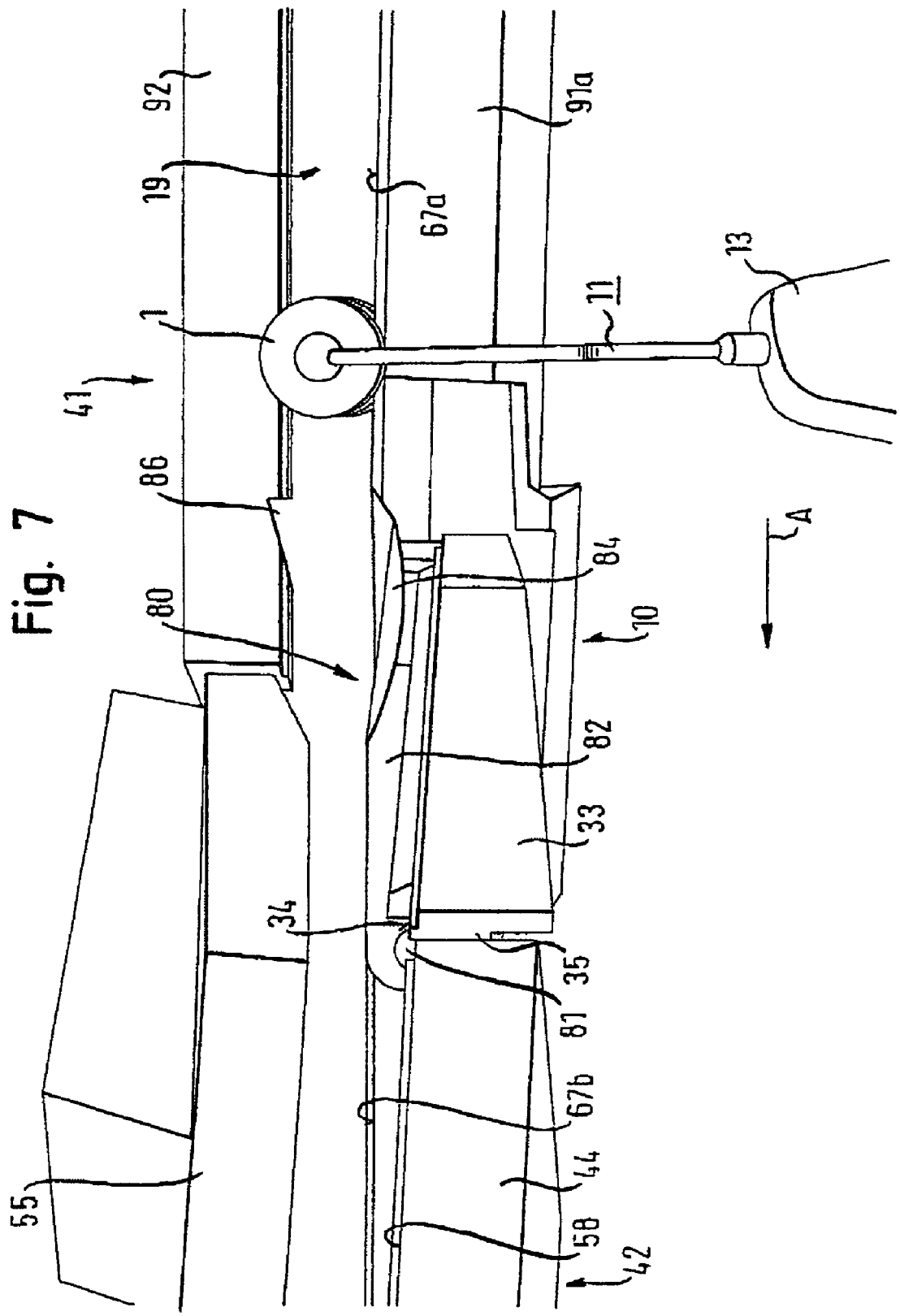
FIG. 7 shows a perspective view of an exemplary embodiment of the suspension-conveyor diverter according to the invention in the case of which the suspension-conveyor diverter is designed as an outlet diverter, a transporting roller with a clothes hanger rolling on a first running path, in an entry section of the first running path.
Figure 8:
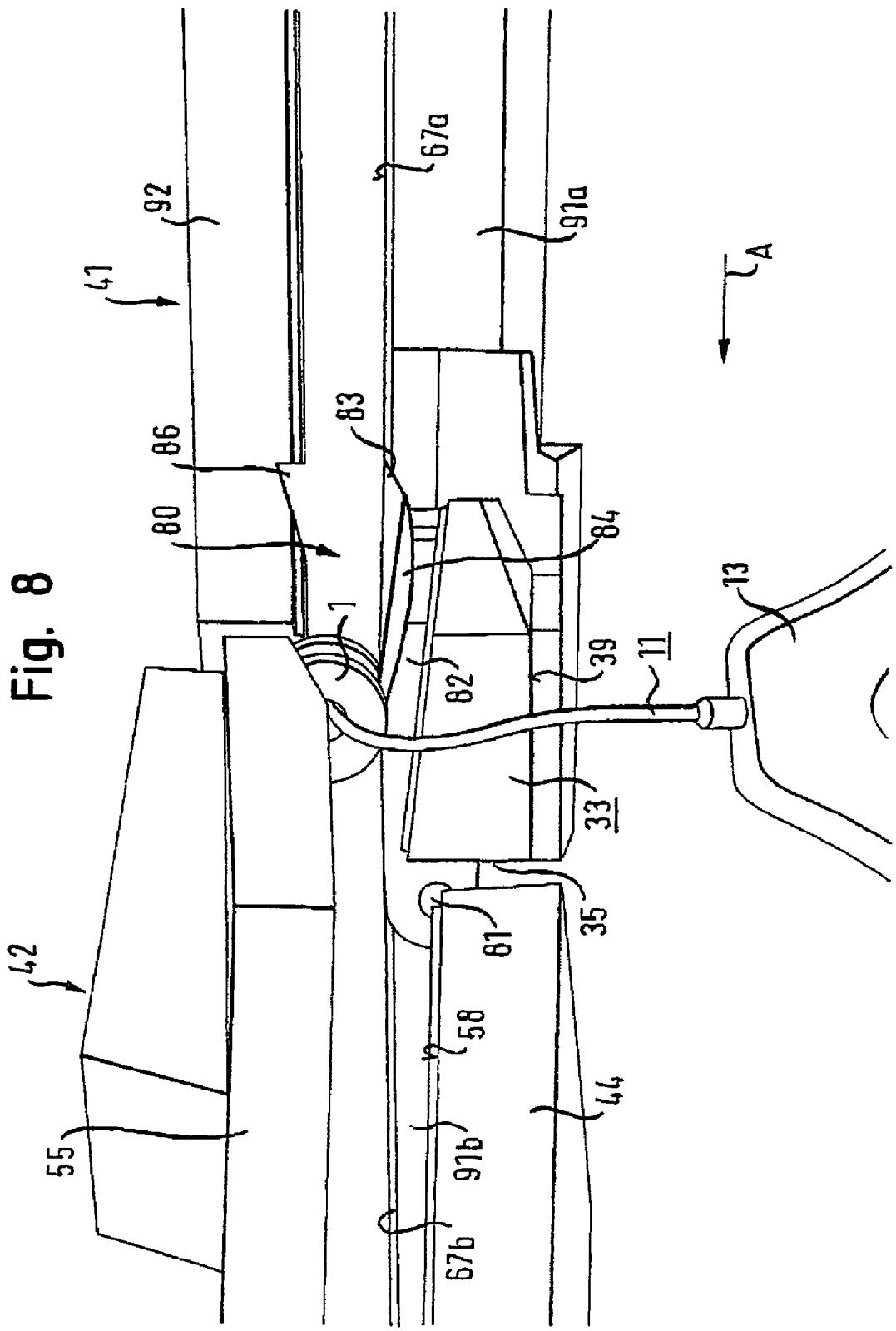
FIG. 8 shows a perspective view of the outlet diverter in FIG. 7, the transporting roller rolling on a connecting arm.

The operation of the outlet diverter 10 will be explained hereinbelow. The conveying-chain drive (not illustrated) is switched on. The conveying chain 73 circulates endlessly in the conveying installation. In particular, the conveyor chain 73 runs horizontally in the conveying guide 71 of the suspension conveyor 2. The hook 11, on which the clothes hanger 13 is fastened and which is fitted to the transporting roller 1, is carried along by the conveying chain 43 in the first section 67a of the main running path 67 of the first base-rail segment 91a (FIG. 7). In this case, the transporting roller 1 rolls on the main running path 67.

In the case of a first operating example (FIGS. 9 and 10), the adjusting control member 80 has been moved into the first position, the free end 83 of the connecting arm 82 being raised into the notch 86 of the top rail 92. The transporting roller 1 rolls toward the adjusting control member 80 and the pivoting rail 33 of the outlet diverter 10 in the operating transporting direction (A). The transporting roller 1 comes into contact with the connecting hand 84 (FIG. 9). The connecting hand 84 continues the guidance of the transporting roller 1 by way of the top rail 92 and directs the transporting roller 1 laterally onto the pivoting rail 33. In this case, the free end of the hook 11 slides laterally out of the interspace 74 in front of the conveying pin 75 (not illustrated in FIGS. 9 and 10), with the result that the conveying pin 75 does not give rise to any conveying action.

However, on account of the slope of the connecting running path 59, the transporting roller 1 runs via the pivoting rail 33 and, on account of the slope of the outlet path 58, continues to run via the outlet base rail 44. The transporting roller 1 thus follows the preset through-passage path through the outlet diverter 10.

In the case of a second operating example (FIG. 8), the adjusting control member 80 has been moved into the second position, the free end 83 of the connecting arm 82 striking against the first base-rail segment 91*a*. The transporting roller 1 rolls toward the adjusting control member 80 and the pivoting rail 33 of the outlet diverter 10 in the operating transporting direction (A).

The transporting roller 1 continues to roll onto the connecting arm 82 via the rectangular rolling-crosspiece profile of the free end 83 of the connecting arm 82. The inside of the hook 11 strikes against a bottom edge 39 of the pivoting rail 33. The conveying pin 75 of the conveying chain 73 carries along the hook 11 further. In this case, the hook 11 forces the pivoting rail 33 inward in the direction of the base rail 91 and/or of the adjusting member 80. The pivoting rail 33 follows the pressure and, on account of the oblique mounting of the pivoting rail 33, is deflected laterally in the direction of the first suspension-conveyor portion 41 and, at the same time, some way upward. The hook 11 is carried along past the pivoting rail 33. The transporting roller 1 runs from the connecting arm 82 onto the second base-rail segment 91*b*. The hook 11 here frees the pivoting rail 33 at its free end 35. The pivoting rail 33 drops downward. On account of the oblique mounting, the pivoting rail 33, at the same time, pivots laterally outward until the free end 35 strikes against the outlet base rail 44, with the result that the preset through-passage path 67*a*, 59, 58 is restored.

The conveying chain 73 has thus carried along the hook 11 by means of the transporting roller 1 on the non-preset path through the outlet diverter 10 without the outlet diverter 10 having been activated. Rather, the hook 11 has actuated the pivoting rail 33 and has thus caused the path to be freed.

| General term | Specific term | Designation |
|---|---|---|
| Diverter | Outlet diverter | 10a, 10b |
| Conveyor | Suspension conveyor | 2a, 2b, 2c |
| Conveyor | Discharge path | 6a, 6b |
| | Operating transporting direction | A |
| Transporting roller | Transporting roller | 1 |
| Conveyor | Feed path | 4 |
| Diverter | Inlet diverter | 8 |
| Carrying element | Hook | 11 |
| | C-shaped profile of the suspension conveyor | 12 |
| | Clothes hanger | 13 |
| | Free end of the clothes hook | 15 |
| | Base wall of the C-shaped profile | 16 |
| | Side wall Of the C-shaped profile | 17 |
| | Top wall of the C-shaped profile | 18 |
| | Opening of the C-shaped profile | 19 |
| | First suspension-conveyor portion of the inlet | 21 |
| | Second suspension-conveyor portion of the inlet | 22 |
| Second carrying-element guide | Inlet base rail | 24 |
| | Bearing pin | 30 |
| Pivoting guide | Pivoting rail of the outlet diverter | 33 |
| | Connecting rolling crosspiece | 34 |
| | Free end of the pivoting rail of the outlet | 35 |

-continued

| General term | Specific term | Designation |
|---|---|---|
| | Bottom edge of the pivoting rail | 39 |
| | First suspension-conveyor portion of the outlet | 41 |
| | Second suspension-conveyor portion of the outlet | 42 |
| Second carrying-element guide | Outlet base rail | 44 |
| | Top guide rail of the outlet diverter | 55 |
| | Outlet path | 58 |
| | Connecting running path of the outlet diverter | 59 |
| | Main running path | 67 |
| | Inlet path | 68 |
| | Connecting running path | 69 |
| Conveying guide | Conveying guide | 71 |
| Conveying means | Conveying chain | 73 |
| | Interspace between adjacent conveying pins | 74 |
| Conveying means | Conveying pins | 75 |
| | Adjusting control member | 80 |
| | Bearing of the adjusting control member | 81 |
| | Connecting arm | 82 |
| | Free end of the connecting arm | 83 |
| | Connecting hand | 84 |
| | Notch in top rail | 86 |
| | Horizontal tongue | 87 |
| | Vertical tongue | 88 |
| First carrying-element guide | Base rail | 91 |
| | Top rail | 92 |
| Pivoting guide | Pivoting rail of the inlet diverter | 93 |
| | Connecting rolling crosspiece | 94 |
| | Top wall of the guide channel | 95 |
| | Guide sleeve of the guide channel | 96 |
| | Guide wall of the guide channel | 97 |
| | Free end of the pivoting rail | 98 |
| | Free end of the pivoting rail of the inlet | 98 |
| Conveyor | Discharge path | 6a, 6b |
| | Outlet path | 58 |
| Second carrying-element guide | Outlet base rail | 44 |
| Diverter | Outlet diverter | 10a, 10b |
| | Opening of the C-shaped profile | 19 |
| | Operating transporting direction | A |
| First carrying-element guide | Base rail | 91 |
| | Base wall of the C-shaped profile | 16 |
| | C-shaped profile of the suspension conveyor | 12 |
| | Top guide rail of the outlet diverter | 55 |
| | Top rail | 92 |
| | Top wall of the C-shaped profile | 18 |
| | Top wall of the guide channel | 95 |
| | Inlet path | 68 |
| Second carrying-element guide | Inlet base rail | 24 |
| Diverter | Inlet diverter | 8 |
| | First suspension-conveyor portion of the outlet | 41 |
| | First suspension-conveyor portion of the inlet | 21 |
| Conveying guide | Conveying guide | 71 |
| Conveying means | Conveying chain | 73 |

-continued

| General term | Specific term | Designation |
| --- | --- | --- |
| Conveying means | Conveying pins | 75 |
| | Free end of the pivoting rail | 98 |
| | Free end of the pivoting rail of the outlet | 35 |
| | Free end of the pivoting rail of the inlet | 98 |
| | Free end of the clothes hook | 15 |
| | Free end of the connecting arm | 83 |
| | Guide sleeve of the guide channel | 96 |
| | Guide wall of the guide channel | 97 |
| Carrying element | Hook | 11 |
| Conveyor | Suspension conveyor | 2a, 2b, 2c |
| | Main running path | 67 |
| | Horizontal tongue | 87 |
| | Notch in top rail | 86 |
| | Clothes hanger | 13 |
| | Bearing of the adjusting control member | 81 |
| | Bearing pin | 30 |
| Pivoting guide | Pivoting rail of the outlet diverter | 33 |
| Pivoting guide | Pivoting rail of the inlet diverter | 93 |
| | Side wall of the C-shaped profile | 17 |
| | Adjusting control member | 80 |
| Transporting roller | Transporting roller | 1 |
| | Bottom edge of the pivoting rail | 39 |
| | Connecting arm | 82 |
| | Connecting hand | 84 |
| | Connecting running path | 69 |
| | Connecting running path of the outlet diverter | 59 |
| | Connecting rolling crosspiece | 34 |
| | Connecting rolling crosspiece | 94 |
| | Connecting rolling crosspiece | 34 |
| | Vertical tongue | 88 |
| Conveyor | Feed path | 4 |
| | Second suspension-conveyor portion of the outlet | 42 |
| | Second suspension-conveyor portion of the inlet | 22 |
| | Interspace between adjacent conveying pins | 74 |

What is claimed is:

1. A suspension-conveyor diverter (8, 10) for a conveyor (2, 4, 6) for transporting hanging objects including items of clothing hanging on hangers (13) on the conveyor (2, 4, 6), comprising:

a conveying guide (71) for a driveable conveying means (73, 75) having a first carrying-element guide (91) for at least one transport roller (1), such guide being disposed so that the object can be hung by means of a carrying element (11) such that the carrying element (11) engages with the conveying means (73, 75), and having a second carrying-element guide (24, 44) that is spaced apart from the first carrying-element guide (91), such second carrying-element guide (24, 44) comprising:

a pivoting guide (33, 93), one end of which is disposed on the second carrying-element guide (24, 44) and preset so that a free end (35, 98) of the pivoting guide (33, 93) strikes against the first carrying-element guide (91), such that the pivoting guide (33, 93) connects the first carrying-element guide (91), and the second carrying-element guide (24, 44) to each other, the pivoting guide being set up for being activated and for being deflected by means of the carrying element (11).

2. The suspension-conveyor diverter as claimed in claim 1, wherein the pivoting guide (33, 93) of the diverter (8, 10) is preset to a through-passage position so that the transport roller (1) with the carrying element (11) passes through the diverter (8, 10) without deflecting the pivoting guide (33, 93).

3. The suspension-conveyor diverter as claimed in claim 2, wherein the pivoting guide (33, 93) is mounted on one of the carrying-element guides (24, 91) such that the preset pivoting guide (33, 93), when activated, is raised and deflected laterally, and wherein the pivoting guide (33, 93), after being activated, drops back into the present position because of the weight-induced force of the pivoting guide.

4. The suspension-conveyor diverter as claimed in claim 3, wherein the pivoting guide (33, 93) is preset in such a way that said pivoting guide (33, 93) can be activated when the transport roller (1) with the carrying element passes through the suspension-conveyor diverter (8, 10) in a predetermined designated transport direction (A), and wherein the pivoting guide (33, 93) blocks the carrying element (11) when the transport roller (1), with the carrying element, runs into the suspension-conveyor diverter (8, 10) in a direction opposite to the predetermined transport direction (A).

5. The suspension-conveyor diverter as claimed in claim 4, wherein the second carrying-element guide (24) moves toward the first carrying-element guide (91) in the designated transport direction (A), and wherein the pivoting guide (93) is mounted on the second carrying-element guide (24).

6. The suspension-conveyor diverter as claimed in claim 4, wherein the second carrying-element guide (44) moves away from the first carrying-element guide (91) in the designated transport direction (A), and wherein the pivoting guide (33) is mounted on the first carrying-element guide (91).

7. The suspension-conveyor diverter as claimed in claim 6, comprising an adjusting control member (80) for adjusting the diverter (10) in a controlled manner to one of two positions: a conveying position, in which the transport roller (1) passes through the suspension-conveyor diverter (10) on the first carrying-element guide (91), or a branching position, in which the transport roller (1) is directed from the first carrying-element guide (91) to the second carrying-element guide (44).

8. The suspension-conveyor diverter as claimed in claim 7, wherein the adjusting control member (80) is preset to the conveying position and adjusted to the branching position by being activated and, after being activated, returns to the preset conveying position.

9. The suspension-conveyor diverter as claimed in claim 8, wherein the adjusting control member (80) is a connecting component (82, 84) that, in the conveying position, connects an entry section (91a) of the first carrying-element guide (91) to an exit section (91b) of the first carrying-element guide (91) and, in the branching position, connects the entry section (91a) of the first carrying-element guide (91) to the second carrying-element guide (44).

10. The suspension-conveyor diverter as claimed in claim 1, wherein the carrying-element guides each have a base rail (91) and a top rail (92), which act to guide their engagement with the transporting roller (1).

11. The suspension-conveyor diverter as claimed in claim 10, wherein the adjusting control member (80) has a first connecting arm (82) that is designed as a base rail and a connecting hand (84) that is designed as a top rail.

12. The suspension-conveyor diverter as claimed in claim 11, wherein the adjusting control member (80) is disposed on the first carrying-element guide (91) such that, in the conveying position of the adjusting control member (80), the first connecting arm (82) connects the base rail in the entry section (91a) of the first carrying-element guide (91) to the base rail in the exit section (91b) of the first carrying-element guide (91), and, in the branching position of the adjusting control member (80), the second connecting arm (84) connects the top rail (92) in the entry section of the first carrying-element guide (91) to the top rail (55) of the second carrying-element guide.

* * * * *